United States Patent [19]

Boeder

[11] Patent Number: 5,106,808
[45] Date of Patent: Apr. 21, 1992

[54] SURFACE ACTIVATOR FOR REDOX-INITIATED ADHESIVES

[75] Inventor: Charles W. Boeder, New Port, Minn.

[73] Assignee: Minnesota Mining and Manufacturing Company, St. Paul, Minn.

[21] Appl. No.: 614,837

[22] Filed: Nov. 13, 1990

Related U.S. Application Data

[62] Division of Ser. No. 297,886, Jan. 17, 1989, Pat. No. 5,003,016.

[51] Int. Cl.$^5$ .............................................. B01J 31/02
[52] U.S. Cl. ..................... 502/167; 564/248; 564/275
[58] Field of Search ................. 502/167; 564/248, 275

[56] References Cited

U.S. PATENT DOCUMENTS

| | | | |
|---|---|---|---|
| 1,780,334 | 11/1930 | Burnett et al. | |
| 2,578,690 | 12/1951 | Gerhart | 260/45.3 |
| 2,694,053 | 11/1954 | Uraneck et al. | 260/84.7 |
| 2,697,700 | 12/1954 | Uraneck et al. | 260/84.1 |
| 3,222,429 | 12/1965 | Boyd et al. | 260/880 |
| 3,591,438 | 7/1971 | Toback et al. | 156/310 |
| 3,616,040 | 10/1971 | Toback | 156/310 |
| 3,870,675 | 3/1975 | Kusayama et al. | 260/32.8 A |
| 3,890,407 | 6/1975 | Briggs, Jr. et al. | 260/878 R |
| 3,933,682 | 1/1976 | Bean | 502/167 X |
| 3,970,505 | 7/1976 | Hauser et al. | 156/331 |
| 3,994,764 | 11/1976 | Wolinski | 156/218 |
| 4,070,334 | 1/1978 | Green | 260/42.53 |
| 4,093,597 | 6/1978 | Olander | 502/167 X |
| 4,182,644 | 1/1980 | Briggs, Jr. et al. | 156/310 |
| 4,257,859 | 3/1981 | Fischer et al. | 204/159.23 |
| 4,404,345 | 9/1983 | Janssen | 526/214 |
| 4,554,301 | 11/1985 | Dohi et al. | 524/210 |
| 4,569,976 | 2/1986 | Zimmerman et al. | 526/204 |
| 4,602,073 | 7/1986 | Skoultchi et al. | 526/208 |

FOREIGN PATENT DOCUMENTS 60-112806  6/1985  Japan.

OTHER PUBLICATIONS

CA 94(13): 102509f, "Cobalt Ion Catalyzed Oxidation of Benzoin," Tsuruya et al., 1980.

*Primary Examiner*—Patrick P. Garvin
*Attorney, Agent, or Firm*—Gary L. Griswold; Walter N. Kirn; Robert H. Jordan

[57] ABSTRACT

Activator compositions for redox-initiated cure of adhesive compositions of ethylenically-unsaturated monomers which comprise the condensation reaction product of an alpha-hydroxy ketone, e.g., benzoin, and a primary amine, and preferably a transition metal salt.

14 Claims, No Drawings

SURFACE ACTIVATOR FOR REDOX-INITIATED ADHESIVES

CROSS-REFERENCE TO RELATED APPLICATIONS

This application is a division of U.S. application 07/297,886, now U.S. Pat. No. 5,003,016.

FIELD OF INVENTION

This invention relates to an improved cure system for adhesives, and particularly relates to a surface activator for redox-initiated two-part adhesives.

BACKGROUND

Two-part adhesive systems typically consist of a first part which comprises a solution of at least one polymerizable monomer, e.g., an acrylic or methacrylic ester, and a free radical initiator, and a second part which comprises an accelerator for the initiator. The adhesive system is cured by polymerization of the mixture by a redox reaction or free radical mechanism. The free radicals are generated by reaction of the initiator, i.e., an oxidant, with the activator or catalyst, i.e., a reductant. Typically, the rate of radical generation, which determines the rate of polymerization or speed of cure, depends in part upon the nature of the redox reaction.

Key factors in performance of these adhesives include resistance to impact and stress, high adhesion to substrates, resistance to environmental attack or degradation, and rate of cure. It is often desirable that the joint parts, one coated with adhesive and the other coated with activator, cure as quickly as possible after being joined together such that the strength of the joint develops rapidly. The more rapid the cure, the less clamp or fixture time required, and, in general, the greater economic advantage offered, particularly in high volume manufacturing processes. Further, in the case of two-part adhesives, the useful lifetime, or "on-the-part life", of the activator is important. It would typically be desirable to prime, i.e., apply activator to, a surface in anticipation of later contact to or assembly with the opposing, adhesive-coated, surface well in advance of assembly time in order to permit greater facility in manufacturing operations.

U.S. Pat. No. 3,994,764 (Wolinski) discloses a redox reaction-curable adhesive composition employing benzoyl peroxide initiator and tertiary amine, e.g., dimethylaniline, activator. The composition optionally also includes an oxidizable heavy metal in the activator. Dimethylaniline is volatile and relatively toxic, however, leading to preference for use of a variety of other aromatic amine derivatives as activators. In some of those cases, however, the odor of aromatic amines is unacceptable to the end user.

U.S. Pat. No. 3,890,407 (Briggs, Jr. et al.) discloses the use of condensation products of amines, e.g., aniline, and aldehydes, e.g., butyraldehyde, as accelerators or activators for sulphonated adhesive compositions. U.S. Pat. No. 4,182,644 (Briggs, J. et al.) discloses the use of an accelerator which may be condensation reaction product of an aldehyde, e.g., butyraldehyde, and a primary amine in adhesive compositions comprising a specified polymer-in-monomer solution, an organic sulfonyl chloride having up to 20 carbon atoms and/or chlorosulfonated polymer, and polymerization catalyst.

U.S. Pat. No. 3,870,675 (Kusayama et al.) discloses a two component adhesive consisting of (1) at least one defined divinyl compound, and at least one rubber material, and (2) an accelerator comprising a thiourea compound, at least one of copper salts, cobalt salts, manganese salts, chromium salts, and vanadium salts of organic or inorganic acids, and an organic volatile solvent.

U.S. Pat. No. 3,970,505 (Hauser et al.) discloses an anaerobic adhesive composition which contains acrylate ester monomers, peroxy initiators, and as an activator, a substituted thiourea and an acidic compound. U.S. Pat. No. 4,554,301 (Dohi et al.) discloses the use of thiourea compounds such as dibutyl thiourea or ethylene thiourea with metal chelate compounds such as vanadyl or cobalt acetylacetonate or metal soaps such as manganese or cobalt naphthenate as accelerators.

U.S. Pat. No. 4,569,976 (Zimmerman et a.) discloses an accelerator comprising a monosubstituted thiourea having a heteroatom in the beta or gamma position relative to the nitrogen bearing the substituent.

U.S. Pat. No. 3,616,040 (Toback) discloses the use of a bonding accelerator comprising the condensation product of an aldehyde and a primary or secondary amine.

U.S. Pat. No. 3,591,438 (Toback et al.) discloses a bonding accelerator containing the condensation product of an aldehyde and a primary or secondary amine used with a reducing activator which is either a sulfur-containing free radical accelerator or a compound containing an oxidizable transition metal.

U.S. Pat. No. 4,170,612 (Pastor et al.) discloses pressure-sensitive adhesive compositions prepared from a mixture of a specific pressure-sensitive polymer, a chlorosulphonated polyethylene, and a polymerizable vinyl compound which can be cured upon contact with a condensation reaction product of a primary or secondary amine and an aldehyde.

SUMMARY OF INVENTION

This invention provides a primer for activating surfaces for adhesive bonding with peroxy- and redox-initiated two part adhesives. The primers or activators provided herein are long lived and provide rapid cure with rapid development of bond strength.

In brief summary, the primers or activators provided by this invention comprise the condensation product of an α-hydroxy ketone and a primary amine. Typically the primers of the invention also comprise a transition metal salt, as such embodiments tend to provide superior cure in comparison to embodiments which do not contain such salts. Activators of the invention are effective on a variety of surfaces, including but not limited to, metals, e.g., steel or aluminum, plastics, and wood. In brief summary, in one aspect the present invention provides a primer composition for activating a surface for adhesive bonding with a redox-polymerizable adhesive composition wherein the primer composition comprises the condensation product of an α-hydroxy ketone and a primary amine.

In another aspect, the present invention provides, briefly summarizing, a two-part adhesive composition comprising:

(A) as a polymerizable adhesive composition a first part containing a mixture of at least one ethylenically-unsaturated monomer subject to redox polymerization, e.g., acrylamides, methacrylamides, acrylates, methacrylates, a free radical initiator, and optionally a solvent; and (B) a second part containing an activator which comprises the condensation product of an α-hydroxy ketone and a primary amine, typically also a transition metal salt, and optionally a solvent.

In a third aspect the present invention provides, in brief summary, a process for bonding two or more surfaces comprising:

(A) applying to at least one of the surfaces an activator composition which comprises the condensation product of an α-hydroxy ketone and a primary amine, typically also a transition metal salt, and optionally a volatile solvent;

(B) applying to at least one of the surfaces an adhesive composition comprising a mixture of at least one ethylenically-unsaturated monomer subject to redox polymerization;

(C) providing a free radical initiator in contact with, typically mixed with, the adhesive composition; and (D) placing the surfaces in abutting relationship, optionally under compressive pressure, until the adhesive composition polymerizes thereby bonding the surfaces together.

DETAILED DESCRIPTION OF INVENTION

The polymerizable portion of a two-part adhesive system of the invention comprises: p0 (A) one or more ethylenically-unsaturated monomers subject to redox polymerization, e.g., acrylamides, methacrylamides, acrylates, methacrylates;

(B) one or more optional elastomeric materials, e.g., tougheners;

(C) a redox-type initiator compound, preferably peroxy-type, most preferably hydroperoxy-type; and (D) optionally one or more other additives known in the art, e.g., fillers, stabilizers, thickening agents, adhesion promoters, antioxidants, dyes, or polymerization inhibitors.

The ethylenically-unsaturated monomers constitute an essential ingredient of the adhesive in that their polymerization converts the initially liquid or soft adhesive composition to a solid having a strong bond to one or more adherends and determines in large part the properties of the resultant bond. Selection of an ethylenically-unsaturated monomer or combinations thereof is dependent, at least in part, upon the properties desired of the resultant bond, e.g., adherends to be bonded, ambient conditions to which the bond will likely be subjected and for which resistance is desired, etc.; viscosity and handling characteristics of the uncured adhesive composition; and compatibility with other components of the adhesive composition. Adhesive compositions are typically preferably not too highly viscous to be handled conveniently, however, in some embodiments it may be desired that the composition be somewhat thick or viscous to facilitate application. When it is desired that the resultant bond be substantially rigid with high shear strength, the monomer mixture preferably has a high glass transition temperature, e.g. above 105° C. for many applications. When it is desired that the resultant bond be flexible, such as where it is desired that the bond tend to dampen vibrations, the monomer mixture preferably has a lower glass transition temperature, e.g., about −20° C. or below for many applications.

A large number of ethylenically-unsaturated monomers which are available commercially and well known to those skilled in the art may be used with the present invention.

In some embodiments, the adhesive will be acrylate-based or methacrylate-based, with the major components of the acrylate monomer portion of the adhesive being esters of acrylic and methacrylic acids, with esters of methacrylic acid being preferred because of the better cure which typically results under normal bonding conditions. These esters may be derived form monofunctional or polyfunctional alcohols, the latter giving rise to, and providing for, crosslinking.

Typical monofunctional monomers include, but are not limited to: methyl methacrylate, hydroxyethyl methacrylate, tetrahydrofurfuryl methacrylate, trimethyl cyclohexyl methacrylate, cyclohexyl methacrylate, methacrylic acid, isobornyl methacrylate, ethoxyethyl methacrylate, 2-ethylhexyl methacrylate, and dicyclopentenyl oxyethyl methacrylate. Typical polyfunctional monomers include, but are not limited to: methacrylate esters of polyethylene glycols, such as the esters of triethylene glycol, 1,6-hexane diol, polypropylene glycol, 1,3- and 1,4-butylene glycol and 1,12-dodecanediol.

In the case of acrylic adhesives, it will typically be preferred that a minor portion, i.e., between about 1 and about 15 weight percent, of the monomer component is acrylic or methacrylic acid. Such monomers are preferred for the improved adhesion to metal surfaces and rapid curing properties typically imparted to compositions comprising same.

In addition to acrylate monomers, other ethylenically-unsaturated monomers can be used in the present invention. Illustrative examples thereof include polymerizable acrylamides and methacrylamides. For instance, a fast-bonding, low odor adhesive composition can be prepared by mixing in any order one part of one or more copolymerizable N-cyclic group-substituted acrylamides, e.g., N-acryloyl-piperidine or N-acryloyl-morpholine, 0.01 to 1.25 parts by weight, preferably 0.1 to 0.2 parts by weight, of one or more ethylenically-unsaturated carboxylic acids copolymerizable with acrylamides and methacrylamides, 0.1 to 1.25 parts by weight, preferably 0.2 to 0.5 parts by weight, of a polymeric toughener, and when necessary to form a fluid of the composition, up to about one part weight of a volatile solvent. The solvent component, which may contain one or more volatile solvents, e.g., methylene chloride or 1,1,1-trichloroethane, may be used to reduce the viscosity of the composition or to bring about the dissolution of the composition or to bring about the dissolution of one or more of the components of the adhesive composition when that component is a solid not completely soluble in the other components. As is known in the art, solvents may also be used for such purposes in adhesive compositions containing other monomers.

Depending upon desired application, process viscosity, and other end use considerations, a number of elastomers or toughening agents may be employed in the adhesive composition. The level of such additive is determined by the desired effect upon the performance and properties of the resultant adhesive composition.

Typical elastomeric agents include: natural and synthetic rubbers, such as chlorosulfonated polyethylenes, butadiene acrylonitrile copolymers, triblock copolymers, such as Shell Chemical Company's KRATON series, linear thermoplastic polyurethanes, and ethylene acrylate copolymers, e.g., DuPont's VAMAC series, as well as oligomers which are vinyl-terminated compounds derived from epoxy resins or diisocyantes reacted with hydroxyl terminated low molecular weight entities. The oligomers are preferably terminated with methacryloyl or acryloyl groups as adhesive compositions containing toughening agents terminated with such terminal groups typically tend to achieve better cure properties. The particular additive selected, and the concentration level used in the formulation will depend upon desired end use and processing criteria.

An important component of the polymerizable portion of the adhesive composition is the free radical initiator, which is preferably a peroxygen compound, and most preferably a hydrogen peroxy compound. In one aspect, the essence of the present invention is the combination of an initiator or oxidant with the activator or reductant, which combination constitutes an improved curing system for redox-initiated adhesive compositions.

Illustrative examples of suitable initiators for use in combination with the polymerizable monomers described above include organic hydroperoxy initiators, particularly those organic hydroperoxides having the formula $R^6OOH$ wherein $R^6$ is a hydrocarbon radical containing up to about 18 carbon atoms, preferably an alkyl, aryl, or araalkyl radical containing from one to 12 carbon atoms. Typical examples of such hydroperoxides are cumene hydroperoxide, tertiary butyl hydroperoxide, methyl ethyl ketone peroxide, and hydroperoxides formed by the oxygenation of various hydrocarbons, such as methylbutene, cetane, and cyclohexene, and various ketones and ethers. Other examples of useful initiators include hydroperoxides such as p-menthane hydroperoxide, 2,5-dimethylhexane, 2,5-dihydroperoxide and the like. Additionally, blends of hydroperoxides with peresters, such as t-butyl perbenzoate or t-butyl-peroxymaleate, can be advantageously used. For reasons of economics, availability, and stability, cumene hydroperoxide is especially preferred.

The level of initiator used may typically vary from about 1 to about 10 percent by weight of the combination of monomer and initiator, with amounts from about 2 to about 4 percent by weight typically providing optimum combination of initiation and cost, and therefore being preferred.

Hydroperoxy initiators typically form exceptionally stable anaerobic adhesive systems. Accordingly, the combination of ethylenically-unsaturated monomer and hydroperoxy initiator typically can be stored for many months without losing effectiveness as an adhesive.

The activator or catalyst compositions provided by the present invention comprise:
(A) the condensation product of an α-hydroxy ketone and a primary amine; and preferably
(B) a transition metal salt.

Useful α-hydroxy ketones have the general formula:

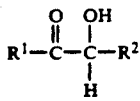

wherein $R^1$ and $R^2$ are independently selected from phenyls, substituted phenyls, or alkyls. If desired, a combination of two or more such α-hydroxy ketones may be used. $R^1$ and $R^2$ are preferably aromatic groups, e.g., as in benzoin. $R^1$ and $R^2$ are preferably aromatics rather than aliphatic groups as aromatically substituted α-hydroxy ketones tend to result in faster cure speeds and improved polymer performance.

Useful amines are the primary amines having the general formula $R^3NH_2$ wherein $R^3$ is an alkyl having from one to 12 carbon atoms, with those having from four to six carbon atoms being preferred as such amines are readily available commercially and typically provide faster reactions for preparation of activator compositions of the invention therewith. If desired, a combination of such amine derivatives may be used.

Aniline, aromatic, and secondary amines should be avoided as the condensation products of such amines with the α-hydroxy ketones described above tend to provide unsatisfactory results including slow cure rate or substantially no activation of cure. Activator compositions of the invention will typically preferably contain the reaction product of between about 1 and about 2.5 equivalents of amine per 1 equivalent of α-hydroxy ketone.

The condensation reaction is typically conducted at temperatures of from about room temperature up to about 80° C. with the removal of water to yield a complex mixture of reaction products which, in accordance with the present invention, are used as surface activators for redox-initiated adhesive compositions. The precise nature of α-hydroxy ketone/amine condensation is not known to have been determined with certainty. It is believed, however, that the product of such reaction is made up of a complex mixture of a large number of compounds. The desired acceleration effects provided by accelerators of the present invention have not been traced to any specific component or components of this mixture. It is believed that one or more of the components of the reaction product contribute in varying degrees to the total effectiveness of the final product.

Activator compositions of the invention preferably also comprise a salt containing one or more of the following transition metals: vanadium, molybdenum, cobalt, iron, or copper. Examples of suitable transition metal salts include, but are not limited to, copper naphthenate, iron naphthenate, cobalt naphthenate, vanadium acetylacetonate, vanadium oxide (acetylacetonate)$_2$, molybdenum oxide (acetylacetonate)$_2$. Transition metals typically speed the rate of cure of adhesive compositions when used in activator compositions of the invention, and typically lead to more complete cure and stronger bonds.

Activator compositions of the invention may contain up to about 50 parts by weight of such metal salt per 100 parts by weight of total activator composition, with between about 10 and about 40 parts by weight of metal salt per 100 parts by weight of total activator composition typically being preferred. Activator compositions containing higher proportions of such metal salts may tend to result in slower cure rate. Further, the adhesion and strength properties of resultant polymers may tend to be impaired and the stability of the activator may tend to be reduced when the activator composition contains higher proportions of such metal salts.

In order to obtain the maximum benefits of the bonding system disclosed herein, it is important that the activator intimately contact the adhesive composition. This is preferably achieved by first dissolving or dispersing the activator in a volatile solvent or combination of solvents. The solution or dispersion of activator in the solvent can then be applied to at least one of the adherends or surfaces to be bonded, and the solvent typically allowed to evaporate leaving a deposit of activator on the surface or surfaces. Because of the extremely rapid cure speed which is typically provided by the activators taught herein, it may be preferred to apply the activator to each of the surfaces which are to be bonded. In this manner, a more uniform manner of polymerization is achieved, stresses in the bond are minimized, and stronger bonds are produced. After application of the activator composition, the adhesive composition is then be applied directly to at least one of the surfaces to be bonded. If activator has been applied to only one surface, it is not material to which surface the adhesive composition is applied. The treated surfaces are then placed or clamped together and the adhesive allowed to cure.

In choosing the solvent for dissolution or dispersion of the activator, a solvent with a rapid rate of evaporation is typically preferred. The high volatility of such a solvent tends to reduce the possibility of trapping solvent in the adhesive system during the bonding operation and tending to weaken the resultant bond. Examples of useful solvents include, but are not limited to, halogenated hydrocarbons, particularly such as chlorinated and/or fluorinated hydrocarbons as methylene chloride, trichloroethane, methylchloroform, and trichloromonofluoromethane; lacquer type solvents such as acetone, methyl ethyl ketone, methyl isobutyl ketone, and ethyl acetate; xylene; benzene; and toluene.

The amount of solvent used in the activator composition limited in part by the solubility characteristics of the activator in the solvent selected. It is desirable to use a concentration which will produce optimum results during normal usage. If too little activator is applied to a surface, maximum speed of cure will not be achieved. If excessive amounts of activator are applied, the activator may tend to form a barrier preventing effective contact between the adhesive composition and the adherend surface, thereby impairing the ultimate strength of the bond which is formed. Typically, it will be preferred to use an activator concentration in the solvent of between about 0.1 and about 10 percent by weight, and more preferably between about 0.2 and about 5.0 percent by weight, of activator, i.e., condensation product and transition metal salt, if any, in total composition. The optimum activator concentration and optimum amount of activator on the bonding surface for a particular application may be readily determined by trial and error.

The activator composition may be applied to an adherend surface by any of several techniques, e.g., brush, spray, dipping, etc. The most preferred method of applying the activator composition to an adherend surface is by aerosol. In this manner a thin, substantially uniform film of activator is easily applied to the surface, and the maximum rate of solvent evaporation is achieved. Furthermore, more highly volatile solvents can be used under aerosol conditions than can be used conveniently in standard atmospheric pressure containers. Typical solvents in this category include, but are not limited to, dichlorodifluoromethane, vinyl chloride, and monochlorodifluoromethane. Upon release from the aerosol container, these solvents tend to evaporate exceedingly rapidly and thus shorten the time period between application of activator and completion of the bonding operation.

The amount of activator to be applied to a given surface should be no more than necessary to obtain efficient acceleration of the bonding operation. Excess activator on one or more of the bonding surfaces can interfere with the bond mechanism between the adherend and adhesive composition, thereby adversely affecting the strength of the final bond. Further, when the amount of activator exceeds about 5 percent by weight of the adhesive composition used, typically little if any addition increase in speed of the cure is noted. Generally, an amount of activator equal to between about 0.05 and 1.0 percent by weight of adhesive composition is adequate. Typically, satisfactory results are obtained with the single application by aerosol or otherwise of a thin film of activator to the surfaces to be bonded When the activator has been applied to the surface and the solvent, if any, has been allowed to substantially evaporate, the bonding operation can proceed in the conventional manner. The adhesive can be applied either to the surface which has been treated with the activator or the appropriate mating surface. Customarily, as with most bonding operations, a thin film of adhesive is most desirable. The two mating surfaces are then placed in abutting relationship, and, preferably, a moderate compressive force is applied to produce a relatively thin layer of adhesive spread substantially evenly between the two surfaces. Typically, a thickness of adhesive between the surfaces of between about 0.001 and about 0.005 inch is desirable. However, activators of the present invention may be used to accelerate cure of bonds having bond thicknesses outside this range if desired.

EXAMPLES

The invention will be further explained with the following illustrative examples which are intended to be nonlimiting. Unless otherwise indicated, all adherends were prepared by wiping with a methylethyl ketone-soaked swab, abrading with SCOTCH-BRITE Brand scrubbing pad (available from 3M), and wiping with a methylethyl ketone-soaked swab. Unless otherwise indicated, all amounts are expressed in parts by weight.

In the examples, the following tests were used except where otherwise indicated. Unless otherwise indicated, all steps and measurements were conducted at room temperature, i.e., about 70° F. (20° C.).

Fixture Time

A sample of the surface activator being tested is applied by brush to a 1 inch by 1 inch (2.5 centimeter by 2.5 centimeter) area of a 1 inch by 4 inch (2.5 centimeter by 10 centimeter) coupon of 1010 cold rolled steel. The adhesive being tested is applied to a similar steel coupon and a 1 inch by 1 inch (2.5 centimeter by 2.5 centimeter) overlap shear bond, having a bond line thickness between about 3 and about 7 mils (75 and 175 microns), is made with the activator-covered portion of the first coupon. The time required for the bond to develop sufficient strength that the coupons become difficult to separate or slide apart by hand, i.e., generally about 50 pounds/inch$^2$ (0.34 Newtons/millimeter$^2$), is the fixture time.

Overlap Shear Strength

Overlap shear bonds were made using 1 inch by 4 inch (2.5 centimeter by 10 centimeter) coupon of 1010 cold rolled steel. The activator was applied to one coupon and the adhesive to the second, in the manner described in the Fixture Time test. The coupons are then contacted to provide a bond area of about 0.5 square inches (2.5 centimeters by 1.3 centimeters). After curing for 24 to 48 hours at about 70° F. (20° C.), the bonds were tested at a jaw separation rate of about 0.1 inch/minute (2.5 millimeters/minute).

T-Peel

T-Peel bonds were prepared as described in ASTM D1876-72 except that 1 inch by 8 inch by 0.032 inch (2.5 centimeter by 20 centimeter by 0.8 millimeter) coupons of 1010 cold rolled steel were used. The indicated activator was applied to one coupon and adhesive to the second coupon as described in the Fixture Time test.

EXAMPLES 1–11 AND COMPARATIVE EXAMPLES A–D

Several α-hydroxy ketone/n-alkylamine condensate activators of the invention were prepared by placing the indicated amounts of ketone, the indicated n-alkylamine, and about 100 milliliters of cyclohexane in a 3 necked flask equipped with a Dean-Stark Trap and a condenser. Each solution was refluxed until the indicated amount of water was removed. The cyclohexane was then removed by evaporation under a reduced pressure and the resulting condensates used as surface activator as discussed below.

| Activator | Hydroxyketone (moles) | Amine (moles) | Water Removed (moles) |
|---|---|---|---|
| I | Benzoin (0.25) | n-butylamine (0.25) | 0.25 |
| II | Benzoin (1) | n-butylamine (2.5) | 2.0 |
| III | Benzoin (0.25) | n-octylamine (0.5) | 0.5 |
| IV | Acetol (0.25) | n-butylamine (0.25) | 0.25 |

The adhesive composition used had the following composition:

| Amount | Component |
|---|---|
| 110.0 | Vinyl-terminated butadiene acrylonitrile |
| 50.0 | Hydroxyethyl methacrylate |
| 22.5 | Methacrylic acid |
| 0.5 | Saccharin |
| 5.0 | Cumene hydroperoxide |

One gram of the indicated activator, 0.2 gram of the indicated transition metal salt, and methylene chloride were mixed to a total weight of about 25 grams and used as the activator composition.

| Example | Activator | Salt | Fixture Time (seconds) |
|---|---|---|---|
| 1 | I | None | 100 |
| 2 | I | Cu(II)acac[1] | 40 |
| 3 | I | Co(II)acac | 120 |
| 4 | I | Co(III)acac | 120 |
| 5 | I | VO(acac)$_2$ | 30 |
| 6 | IV | Co(III)acac | 600 |
| 7 | I | Iron naphthenate | 45 |
| 8 | II | VO(acac)$_2$ | 30 |
| 9 | II | TiOacac | <600 |
| 10 | II | MoO(acac)$_2$ | 60 |
| 11 | III | VO(acac)$_2$ | 40 |
| A | None | Co(III)acac | >2400 |
| B | None | VO(acac)$_2$ | 120 |
| C | None | TiOacac | >900 |
| D | None | MoO(acac)$_2$ | >600 |

[1]acac is acetylacetonate

These Examples illustrate the faster cure rate which is achieved with activators of the invention. Example 1 illustrates the fast cure provided by α-hydroxy ketone/amine condensates as taught herein, and Examples 2–11 illustrate the increased cure rate provided by utilizing transition metal salts with such condensates.

Comparative Examples A–D illustrate the relatively slower cure rates achieved with transition metal salts without the condensates described herein.

EXAMPLES 12–14

Example 12–14 illustrate the use of an activator of the invention with acrylamido monomers.

In Example 12, 65 parts of N-acryloyl-piperidine, 10 parts of methacrylic acid, 0.5 part cumene hydroperoxide, and 25 parts KM 653 Core/Shell Elastomer, from Rohm & Haas, were mixed by hand. The adhesive compositions of Examples 13 and 14 were prepared in the same way as that of Example 12 except 65 parts N-acryloyl-morpholine and 65 parts of N-acryloyl-2,6-dimethylmorpholine, respectively, were used in place of N-acryloyl-piperdine.

In each Example, about a 2 micrometer thick layer of an activator composition comprising activator I from Examples 1–11 and vanadium (acetyl acetonate)$_2$ was applied to a steel test panel. A layer of the adhesive composition being tested about 75 microns was applied to a second test panel. The test panels were then placed together in abutting relationship and the bonds allowed to cure. The activator compositions caused each of the adhesive compositions to cure satisfactorily.

The results after curing for two days were as follows:

| Example | Overlap shear Strength[1] | T-Peel Strength[2] |
|---|---|---|
| 12 | 16.5 | 93 |
| 13 | 16.2 | 187 |
| 14 | 14.3 | 31 |

[1]MegaPascals
[2]Newtons per 25 millimeter-width

Various modifications and alterations of this invention will become apparent to those skilled in the art without departing from the scope and spirit of this invention.

What is claimed is:

1. An activator composition for activating surfaces for adhesive bonding with a redox-polymerizable adhesive composition, said activator composition comprising the condensation product of an α-hydroxy ketone and a primary amine.

2. The activator composition of claim 1 wherein said α-hydroxy ketone has the formula:

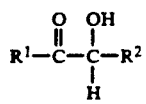

wherein $R^1$ and $R^2$ are independently selected from phenyls, substituted phenyls, or alkyls.

3. The activator composition of claim 1 wherein said α-hydroxy ketone is benzoin.

4. The activator composition of claim 1 wherein said primary amine has the formula:

ti $R^3NH_2$ wherein $R^3$ is an alkyl having one to 12 carbon atoms.

5. The activator composition of claim 1 wherein said primary amine has the formula:

$$R^3NH_2$$

wherein $R^3$ is an alkyl having four to six carbon atoms.

6. The activator composition of claim 1 wherein said condensation product is the product of between about 1 and about 2.5 equivalents of said amine per equivalent of said α-hydroxy ketone.

7. The activator composition of claim 1 further comprising a transition metal salt.

8. The activator composition of claim 7 wherein said metal salt contains at least one of the following metal atoms: vanadium, molybdenum, cobalt, copper, or iron.

9. The activator composition of claim 7 wherein said metal salt is one of vanadium oxide (acetylacetonate)$_2$ or vanadium acetylacetonate.

10. The activator composition of claim 7 comprising up to about 50 parts by weight of said transition metal salt per 100 parts by weight of said activator composition.

11. The activator composition of claim 7 comprising between about 10 and about 40 parts by weight of said transition metal salt per 100 parts by weight of said activator composition.

12. The activator composition of claim 1 which is dispersed or dissolved in a volatile organic solvent.

13. The activator composition of claim 12 wherein said activator composition comprises between about 0.1 and about 10 percent by weight of said condensation product.

14. The activator composition of claim 12 wherein said activator composition comprises between about 0.2 and about 5.0 percent by weight of said condensation product.

* * * * *